United States Patent Office 3,164,828
Patented Jan. 5, 1965

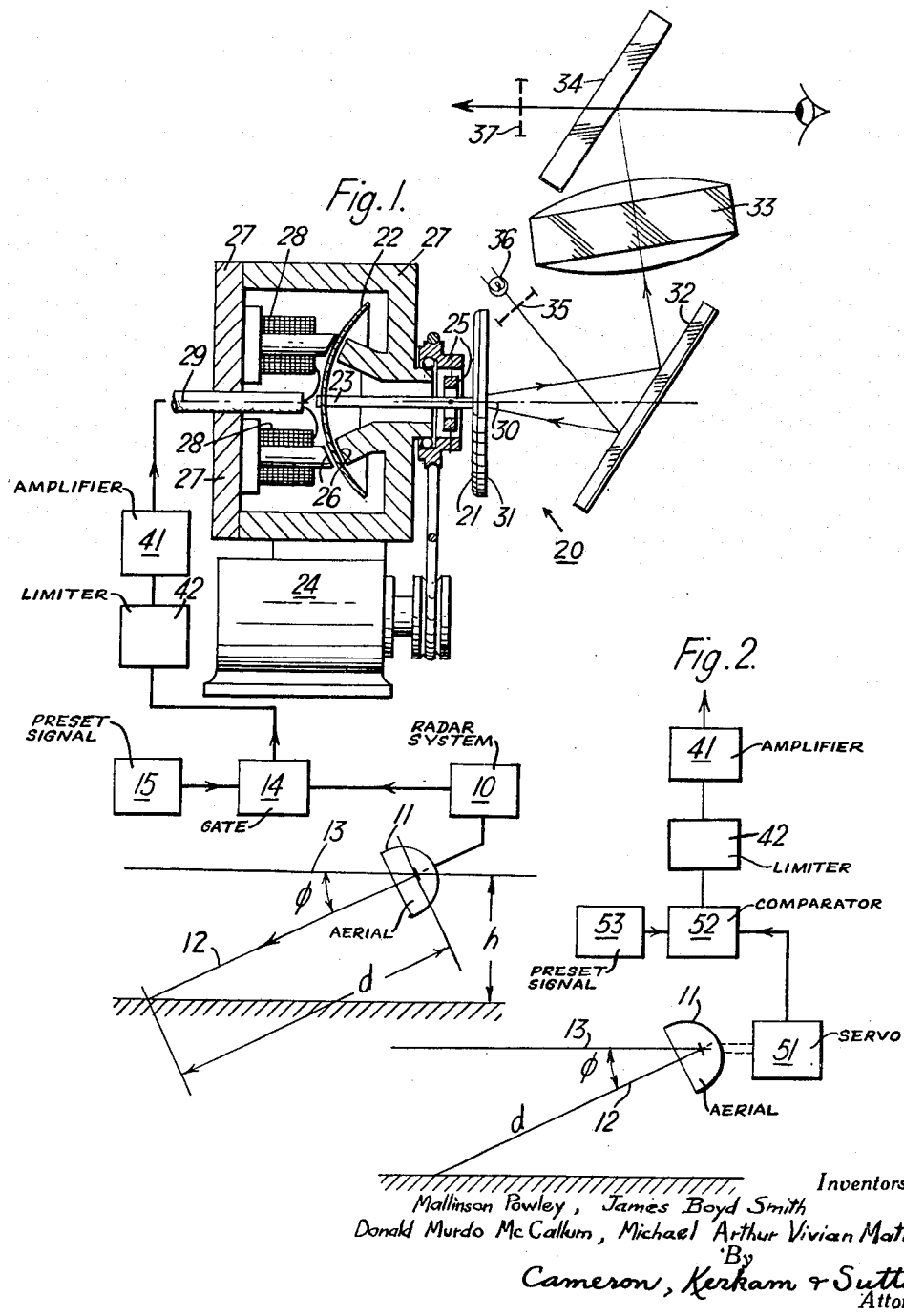

3,164,828
AIRCRAFT FLIGHT-CONTROL APPARATUS DISPLAYING A TERRAIN CLEARANCE SIGNAL
Mallinson Powley, Edinburgh, James Boyd Smith, Portobello, Midlothian, and Donald Murdo McCallum and Michael Arthur Vivian Matthews, Edinburgh, Scotland, assignors to Ferranti, Limited, Hollinwood, Lancashire, England, a company of Great Britain and Northern Ireland
Filed Feb. 20, 1959, Ser. No. 794,763
Claims priority, application Great Britain, Feb. 22, 1958, 5,816/58
10 Claims. (Cl. 343—7)

This invention relates to aircraft flight-control apparatus and specifically to airborne apparatus to aid profile flying. By "profile flying" is meant flying in an endeavour to follow the profile of the ground, rising over hills and dipping into valleys, whilst keeping as far as possible at the same height above the ground directly beneath the aircraft.

An object of the invention is to provide apparatus for this purpose.

A further object is to provide apparatus for this purpose in which the aid is presented to the pilot in the form of a head-up display. The term "head-up display" as used herein is a phrase commonly applied by the British Royal Air Force to an aircraft instrument which is so positioned that its display may be observed by the pilot without turning his eyes appreciably from the line of flight of the aircraft, as distinguished from a panel mounted instrument which he can observe only by looking downwards into the cockpit.

Another object is to provide such apparatus the display of which enables the pilot to correct any departure from the profile course at a rate dependent on the extent of such departure.

In accordance with the present invention, flight-control apparatus for displaying in an aircraft at any given moment an indication of the course in elevation appropriate to profile flying at that moment includes means including a gyro rotor for displaying said indication in the form of an optical image at infinity which is movable in elevation in dependence on any deviation of the axis of said rotor from a datum direction in elevation, a datum image located to coincide with said optical image when the axis of the rotor lies in said datum direction, means for applying constraints to the rotor by eddy currents induced in a part thereof by a magnetic system fixed with respect to that datum direction in the plane of elevation, a radar system for directing a beam transmission to the ground ahead of the aircraft and deriving from that transmission a height-indicating signal dependent on the range to the ground ahead of the aircraft and on the angle of depression of that range from the flight line, a comparison stage for deriving an error signal dependent on the extent and sense of the difference between said height-indicating signal and a predetermined value thereof appropriate to the desired height above the ground of said course, and means for energising said magnet system by said error signal, whereby so long as said optical image is maintained in coincidence with said datum image the course of the aircraft in elevation is substantially a profile course.

The said angle of depression of the range, or the range itself, may be fixed, the height-indicating signal varying with the range only, or with only the angle of depression of the range, as the case may be.

The error signal may be applied to the magnet system in the sense for causing the optical image to rise above or fall below the datum image accordingly as the profile course requires an upward or a downward turn of the aircraft, as the case may be, from the actual course.

Said indication may be in the form of a head-up display.
In the accompanying drawings,
FIGURE 1 shows a part sectional, part diagrammatic view of apparatus according to one embodiment of the invention, and
FIGURE 2 shows a part of the apparatus of FIGURE 1 modified in accordance with another embodiment.

In carrying out the invention in accordance with one form by way of example, see FIG. 1, airborne flight-control apparatus for an aircraft to aid profile flying includes a radar system 10 arranged to direct to the ground ahead of the craft from an aerial system 11 a beam transmission 12 which is directional in elevation. The aerial system is secured so that the transmission is at a fixed angle of depression $\phi$ from the flight line 13. From the echo responses to pulse signals so transmitted is derived at any given moment a height-indicating signal dependent on the measured range at that moment from the craft of the ground ahead of it at the fixed angle of depression $\phi$. A suitable radar system for this purpose is that known as the monopulse system.

The signal thus derived is applied to a gating stage 14 arranged to compare the signal with a preset signal corresponding to a range of predetermined value $d$, appropriate to the desired height $h$ of the craft above the ground directly beneath. This preset signal is derived from a stage 15 by means of which the signal may be adjusted to the particular value of $d$ required.

The gate 14 derives from this comparison an error signal which is of one or other sense depending on whether the measured range is greater or less than the value $d$, and in consequence on whether the craft should turn downwards or upwards, this signal having a value directly dependent on the extent of the difference.

The associated display means 20 in the craft includes gyro apparatus similar to that shown in FIGURE 2 of British patent specification No. 25582/54, corresponding to FIGURE 1 of U.S. Patent No. 3,018,476, dated January 23, 1962, and to that shown in FIGURES 2–6 of U.S. Patent No. 2,527,245, dated October 24, 1950. Briefly, this apparatus consists of a gyro rotor comprising the actual weighted gyro wheel 21 and a spherical dome 22 of material of low electrical resistivity, such as aluminium, secured to a common spindle 23. The rotor is driven from a motor 24 by way of a Hooke's joint 25 which also acts as the suspension for the rotor. The centre of curvature of the dome 22 coincides with the centre of the joint.

The dome passes through gaps between the pole faces 26 of four independent magnetic systems, each including a magnetic circuit 27 energised by a coil 28 individual to it. These four systems are located symmetrically in pairs with respect to what may be termed the datum axis 29 of the instrument, this axis being coincident with the gyro rotor axis 30 when the range has the value $d$, as explained in more detail below. The centre-lines of one pair of magnetic circuits and those of the other pair lie respectively in orthogonal planes intersecting in the datum axis. One of these planes is the plane of elevation, which, in the figure, is the plane of the paper. The present invention makes use of only the two magnetic systems which are centred on the plane of elevation; accordingly any references hereinafter to the magnetic systems should be understood as alluding to those two systems only.

The front face of the gyro wheel 21 has a mirror 31 which forms part of an optical display system—including a fixed mirror 32, a lens 33, and a transmitting reflector 34—which provides for the pilot a head-up display at infinity of an image of a graticule 35 as illuminated by a lamp 36. When the rotor axis 30 coincides with the datum axis 29 this image coincides with a fixed datum image 37 fixed in the line of sight from the pilot to the ground ahead. Angular deflections of the rotor axis in the elevation plane displace the graticule image, as seen by the pilot, upwards or downwards from the datum image.

The error signal, after suitable amplification at a stage 41, is applied in push-pull to the respective coils 28 of the magnetic system. The eddy currents induced in the rotating dome 22 by these coils apply constraints to the gyro equivalent to two springs acting in opposite directions in the elevation plane, the respective forces being dependent on the flux strength. The effective magnetic axis of the combined systems, and therefore, the effective centre of action of the constraint, is movable in the elevation plane in dependence on the relative values of the currents in the two coils and hence in dependence on the error signal.

In operation, assume to begin with that the aircraft is flying on a level course at the desired height $h$ above level ground. The measured range to the ground ahead at the fixed angle of depression $\phi$ from the flight line has therefore the predetermined value $d$ and no error signal is developed. As this signal is zero the coils 28 of the gyro magnet system are unenergised and no constraints are applied to the dome. The rotor axis 30 therefore coincides with the datum axis 29, with the result that the image of graticule 35, as seen in the transmitting reflector 34, coincides with the datum image 37. This display is interpreted by the pilot as indicating that he is flying at the desired height.

Suppose now that the ground ahead becomes inclined upwards. Whilst the craft remains flying on a level course the measured range shortens, falling below the predetermined value $d$, as preset in stage 14, thereby causing an error signal to be developed by gate 14 and energise the magnet coils 28. The sense of this signal is such as to displace the effective magnetic axis from the datum axis in the direction for making the gyro so precess from the datum axis as to elevate the graticule image above the datum image. The pilot interprets this as a demand to turn the craft upwards; this he does, endeavouring to bring the images back to coincidence and maintain them there.

The properties of the gyro apparatus are such that an upward turn of the craft in response to an upward displacement of the graticule image causes the rotor axis to lag behind the magnetic axis of the instrument by an angle proportional to the rate of turn, and thus tends to reduce or cancel the displacement of the graticule image from the datum image which was induced by the error signal. By keeping the images coincident, therefore, the pilot maintains the rate of turn at a value dependent on the error signal and hence dependent on the extent of departure from the desired height.

As the turn proceeds and the inclination of the flight line becomes more nearly equal to the inclination of the ground, the measured range lengthens again, and the error signal becomes progressively smaller so that the pilot finds it possible to keep the images in coincidence with a progressively lessening rate of turn. In the limit, when the error signal is zero, the aircraft may fly, without turning in elevation, on a straight course parallel to the ground and at a safe height appropriate to the range $d$.

When the ground levels out again the measured range lengthens, rising above the value $d$. An error signal of opposite sense is thus developed, which results in a displacement of the graticule image below the datum image. The pilot responds by turning the craft downwards, to restore and maintain coincidence of the images. The measured range then shortens towards the value $d$. The error signal thus reduces towards zero, and as it does so the rate of turn necessary to counteract it becomes correspondingly reduced, until at least the craft is again flying a level course at the desired height.

The operation is similar where the ground becomes inclined downwards from the level. In this case the graticule image falls below the datum image and in response the pilot turns the craft downwards. It is known that it is inadvisable for physiological reasons to subject a pilot to a downward rate of turn corresponding to an acceleration much in excess of $g./2$. This restriction may be preset in the apparatus of the invention in various ways. A convenient arrangement is to apply the error signal to a limiter stage 42 which when the signal has the sense appropriate to a downward turn prevents it from exceeding the value for which the correcting rate of turn exceeds the advisable limit.

It will be appreciated that by displaying this profile-flying information in a head-up manner at infinity the invention has the important advantage of conveying that information to the pilot without appreciably distracting his attention from observance of the ground itself.

It will also be appreciated that the rate-of-turn response characteristic imparted to the gyro by its magnetic constraints provides the further important advantage of enabling the pilot to correct his course in elevation at a rate directly dependent on the extent of its departure from the desired course.

Various details of the above-described embodiment may be modified in accordance with the invention. For example, the radar system may be such as to determine the angle of depression from the flight line of a beam of fixed range to the ground ahead, the error signal being derived from comparison of this angle with a predetermined value of it appropriate to the desired height.

In this arrangement—see FIG. 2—the aerial system 11 instead of being fixed is controlled in elevation by some convenient servo system 51 so that the measured range has a constant value $d$. From the servo system is derived a height-indicating signal which at any given moment is dependent on the varying angle of depression of the beam from the flight line 13 at that moment. This signal is compared in a stage 52 with a presettable datum signal, derived from an adjustable stage 53, which represents the value $\phi$ of the angle of depression appropriate to the desired value of the height. The error signal from stage 52 is applied to amplifier 41 (by way of limiter 42, if required) and thence to the display means. The operation of the apparatus is otherwise as before.

Where the ground flown over is very hilly a condition may arise where two successive hills in the path of the aircraft are so close to one another that at the time the further summit is at the predetermined range $d$ it is screened from the radar equipment by the nearer summit. By the time that the radar equipment picks up the further summit, therefore, the craft is following a downward turn over the nearer summit, and thus no signal at the range $d$ will be received from the further summit.

A warning of such a dangerous conformation may be derived by means of a second radar beam directed to the ground ahead within a second predetermined range $d^1$. For safety all the ground at a range less than $d^1$ must be at greater angles of depression below the flight line than a predetermined angle. The radar beam detects any ground within this range at any smaller angle than the predetermined one, and generates a signal to cause the pilot to turn upwards by a sufficient amount.

What we claim is:

1. Flight-control apparatus for displaying in an aircraft at any given moment an indication of the course in elevation of the aircraft appropriate to profile flying at that moment including means including a gyro rotor for displaying said indication in the form of an optical image at infinity which is movable in elevation in dependence on any deviation of the axis of said rotor from a datum direction in elevation, a datum image located to coincide with said optical image when the axis of the rotor lies in said datum direction, means for applying constraints to the rotor by eddy currents induced in a part thereof by a magnetic system fixed with respect to that datum direction and lying entirely in the plane of elevation, a radar system for directing a beam transmission to the ground ahead of the aircraft and deriving from that transmission a height-indicating signal dependent on the range to the ground ahead of the aircraft and on the angle of depression of that range from the flight line, a comparison stage for deriving an error signal dependent solely on the extent and sense of the difference between said height-indicating signal and a predetermined value thereof appropriate to the desired height above the ground of said course, and means for so applying said error signal to energise said magnetic system and thereby vary the elevational inclination of the rotor axis as to displace said optical image above the datum image when the height of the aircraft falls below the desired height and vice versa, and to effect said displacement at a speed which is dependent on the magnitude of said error signal, whereby so long as said optical image is maintained in coincidence with said datum image the course of the aircraft in elevation is substantially a profile course.

2. Apparatus as claimed in claim 1 wherein the said angle of depression of the range is fixed and the height-indicating signal varies with said range only.

3. Apparatus as claimed in claim 1 wherein the said range is fixed and the height-indicating signal varies with only the angle of depression of that range.

4. Apparatus as claimed in claim 1 wherein said indication is in the form of a head-up display.

5. Flight-control apparatus for displaying in an aircraft at any given moment a visual indication of the course in elevation which the aircraft should be flying at that moment in order to maintain the aircraft at a predetermined height above the ground directly beneath the aircraft comprising an optical system through which the ground ahead of the aircraft may be observed having a line of sight which is fixed in relation to the line of flight of the aircraft and including a datum image located in and fixed with respect to said line of sight, a magnetic system carried by the aircraft having an axis of symmetry which is fixed with respect to a datum direction in the aircraft, said magnetic system including a plurality of individually energisable magnetic circuits symmetrically disposed with respect to said datum direction and lying entirely in the plane of elevation of the aircraft, means including a gyro rotor for forming an optical image discernible by an observer viewing the ground ahead through said optical system, said optical image being movable in elevation relative to said datum image in dependence on deviations of the axis of said rotor from said datum direction in elevation and said datum image being so located that said optical image coincides therewith when the axis of said rotor lies in said datum direction, said rotor including a part wherein eddy currents are induced by the magnetic flux flowing in the magnetic circuits of said magnetic system so as to apply constraints to said rotor when the rotor axis deviates from said datum direction in elevation, a monopulse radar system for directing a depressed beam transmission to the ground ahead of the aircraft and producing from said transmission a height-indicating signal having a value dependent on the range to the ground ahead of the aircraft and on the angle of depression of the beam with respect to the line of flight of the aircraft, means for producing a signal of predetermined value corresponding to the predetermined height above the ground at which it is desired that the aircraft shall fly, means for comparing said height-indicating signal and said signal of predetermined value and producing an error signal dependent on the extent and sense of the difference between said height-indicating signal and said signal of predetermined value, and means responsive to said error signal for energising said magnetic system to apply constraints to said rotor such as to displace the optical image from the datum image in the direction in elevation in which, and at a rate indicative of that at which, the aircraft should be turned in order to maintain the aircraft at the predetermined height above the ground.

6. Apparatus as claimed in claim 5 wherein the radar system includes an aerial which is so fixed to the aircraft that the beam is transmitted at a fixed angle of depression relative to the line of flight, whereby the height-indicating signal varies only with the range to the ground ahead along the beam.

7. Apparatus as claimed in claim 5 wherein the radar system includes an aerial which is so movable with respect to the aircraft as to vary the angle of depression of the transmitted beam relative to the line of flight, and means for so controlling the angle of depression of said aerial that the range to the ground ahead along the beam has a predetermined constant value, whereby the height-indicating signal varies only with the angle of depression of the beam.

8. Apparatus as claimed in claim 5 wherein the magnetic system is so energised in response to the error signal as to cause the optical image to rise above the datum image when an upward turn of the aircraft is required to maintain the predetermined height above the ground and to cause the optical image to fall below the datum image when a downward turn of the aircraft is required to maintain said predetermined height.

9. Apparatus as claimed in claim 5 wherein the optical image and the datum image are observable in the form of a head-up display.

10. Apparatus as claimed in claim 5 including means operative when the error signal has the sense which produces a downward movement of the optical image relative to the datum image for limiting the value of said signal to a predetermined value so that the downward rate of turn of the aircraft for restoring the aircraft to the predetermined height above the ground does not exceed a predetermined limit.

References Cited by the Examiner

UNITED STATES PATENTS

| | | | |
|---|---|---|---|
| 2,443,748 | 6/48 | Sanders | 244—77 |
| 2,630,283 | 3/53 | Hanson | 244—77 |
| 2,686,022 | 8/54 | Hanna | 244—77 |
| 2,809,340 | 10/57 | Bernhart | 244—77 |
| 2,965,894 | 12/60 | Sweeney | 343—7 |
| 2,979,711 | 4/61 | Shelley | 343—7 |

CHESTER L. JUSTUS, *Primary Examiner.*

FREDERICK M. STRADER, *Examiner.*